United States Patent [19]

Bachl et al.

[11] 4,367,321

[45] Jan. 4, 1983

[54] PREPARATION OF HOMOPOLYMERS AND COPOLYMERS OF α-MONO-OLEFINS BY MEANS OF A ZIEGLER CATALYST SYSTEM

[75] Inventors: Robert Bachl, Worms; Peter Klaerner, Battenberg; Guenther Schweier, Friedelsheim; Ehler Ehlers, Mutterstadt, all of Fed. Rep. of Germany

[73] Assignee: BASF Aktiengesellschaft, Fed. Rep. of Germany

[21] Appl. No.: 249,680

[22] Filed: Mar. 31, 1981

[30] Foreign Application Priority Data

Apr. 24, 1980 [DE] Fed. Rep. of Germany ....... 3015702

[51] Int. Cl.$^3$ .......................... C08F 4/02; C08F 10/00
[52] U.S. Cl. ................ 526/124; 252/429 B; 526/114; 526/119; 526/122; 526/352; 526/906
[58] Field of Search ................ 526/114, 119, 122, 124

[56] References Cited

U.S. PATENT DOCUMENTS

| | | | |
|---|---|---|---|
| 3,941,760 | 3/1976 | Herbeck et al. | 252/429 C |
| 4,224,183 | 9/1980 | Staeger | 526/124 |
| 4,239,650 | 12/1980 | Franke et al. | 526/119 |
| 4,305,840 | 12/1981 | Zucchini et al. | 526/124 |

FOREIGN PATENT DOCUMENTS

| | | | |
|---|---|---|---|
| 2600593 | 7/1976 | Fed. Rep. of Germany | 526/124 |
| 1532332 | 11/1978 | United Kingdom. | |

Primary Examiner—Edward J. Smith
Attorney, Agent, or Firm—Keil & Witherspoon

[57] ABSTRACT

A process for the preparation of homopolymers and copolymers of α-monoolefins by polymerizing the monomer or monomers with a Ziegler catalyst system comprising (1) a titanium-containing catalyst component and (2) a relevant conventional organo-aluminum compound, (1.1) the catalyst component (1) having been prepared by (1.1.1) milling a titanium compound (I) of the formula $TiCl_3 \cdot z(AlCl_3)$ or $Cl_mTi(OB)_{4-m}$, where z is from 0 to 0.5, m is from 0 to 3 and B is alkyl, together with (1.1.2) a magnesium alcoholate (II) and, if desired, (1.1.3) a metal chloride (III) of the formula $AlCl_3$, $ZnCl_2$ or $MnCl_2$, to form a milled product (IV), in which polymerization process a catalyst component (1) is employed, in the preparation of which (1.2) the milled product (IV) obtained according to (1.1) is brought together, in an additional step (1.2.1), with (1.2.2) an alkanol (V) and (1.2.3) a liquid alkane (VI), to form a suspension (VII), and thereafter (1.3), in a further additional step (1.3.1), there is added, to the suspension (VII) obtained according to (1.2), (1.3.2) a metal compound (VIII) of a certain type, the metal being aluminum, silicon or titanium, while preserving the suspension state, the product (IX), which results from stage (1.3) and is present as a solid phase in the suspension, constituting the titanium-containing catalyst component (1).

8 Claims, No Drawings

PREPARATION OF HOMOPOLYMERS AND COPOLYMERS OF α-MONO-OLEFINS BY MEANS OF A ZIEGLER CATALYST SYSTEM

The present invention derives from a process for the preparation of homopolymers and copolymers of $C_2$–$C_6$-α-monoolefins by polymerizing the monomer or monomers at from 30° to 200° C., under a pressure of from 0.1 to 200 bar, by means of a Ziegler catalyst system comprising (1) a titanium-containing catalyst component and
(2) an aluminum compound of the formula $$AlA_{3-n}X_n$$

where

A is a $C_1$–$C_{18}$-hydrocarbon radical, preferably a $C_1$–$C_{12}$-alkyl radical or $C_3$–$C_{12}$-alkenyl radical, and especially a $C_2$–$C_8$-alkyl radical, X is chlorine, bromine or hydrogen, preferably chlorine or hydrogen and n is from 0 to 2, preferably from 0 to 1, and especially 0, with the provisos that the atomic ratio of titanium from catalyst component (1) to aluminum from catalyst component (2) is from 1:0.1 to 1:500, preferably from 1:0.2 to 1:200, and that (1.1) to prepare the catalyst component (1)
(1.1.1) a titanium compound (I) of the formula $$TiCl_3 \cdot z(AlCl_3) \text{ or } Cl_m Ti(OB)_{4-m}$$

where z is from 0 to 0.5, especially from 0.31 to 0.35, m is from 0 to 3, especially from 0 to 2, and B is $C_1$–$C_{18}$-alkyl, especially $C_2$–$C_8$-alkyl, and (1.1.2) a magnesium alcoholate (II) of the formula $$Mg(OD)_2$$

where D is a monovalent $C_1$–$C_{18}$ saturated-aliphatic and/or aromatic hydrocarbon radical, preferably a monovalent $C_1$–$C_{10}$ saturated-aliphatic hydrocarbon radical or phenyl and especially $C_1$–$C_4$-alkyl, (1.1.3) with or without, but advantageously with, a metal chloride (III) of the formula $AlCl_3$, $ZnCl_2$ or $MnCl_2$, preferably $AlCl_3$, in the weight ratio of titanium compound (I) to magnesium alcoholate (II) of from 1:200 to 1:0.2, preferably from 1:1 to 1:100, and in the weight ratio of titanium compound (I) to metal chloride (III) of from 1:0 to 1:20, preferably from 1:0 to 1:5, are milled, preferably dry, with one another for from 1 to 200, preferably from 5 to 100, hours, under a milling acceleration of from 30 to 70 m/s², to form a milled product (IV).

Processes of this type are known, and typical examples may be found in British Patent No. 1,532,332 or U.S. Pat. No. 3,941,760.

At the center of the processes mentioned, and of other parallel processes, there is a titanium-containing catalyst component (1) prepared in a specific manner and hence constituting a specific embodiment.

The various embodiments of the titanium-containing catalyst component are aimed at achieving particular objectives, for example the following:

(a) Catalyst systems which can give an increased yield of polymer, namely systems which have a higher productivity, ie. systems in which the amount of polymer formed per unit weight of catalyst system (1) is increased.

(b) Catalyst systems by means of which less or no halogen is introduced into the polymer, this being achievable ($b_1$) by increasing the yield as in (a) and/or ($b_2$) by employing a titanium-containing catalyst component which contains very little or no halogen.

(c) Catalyst systems which display their advantageous effects even at relatively low temperatures; this can be of importance in, for example, dry phase polymerization.

(d) Catalyst systems by means of which the morphological properties of the polymers are influenced in a certain way, for example in the sense of giving a uniform particle size and/or reducing the proportion of fines and/or giving a high bulk density; this can be of importance in, for example, the technical control of polymerization systems, in working up the polymers and/or in respect of the processability of the polymers obtained.

(e) Catalyst systems which are simple and safe to prepare and easy to handle, for example systems which can be prepared in (inert) hydrocarbon auxiliary media.

(f) Catalyst systems which make it possible, where the polymerization is carried out using a molecular weight regulator, such as hydrogen, to manage with relatively small amounts of such a regulator; this can, for example, be important as regards the thermodynamics of the process.

(g) Catalyst systems tailored for specific polymerization processes, for example those intended to suit either the specific peculiarities of suspension polymerization or the specific peculiarities of dry phase polymerization.

According to experience gathered hitherto, there are, amongst these numerous objectives, some which can only be achieved by special embodiments of the titanium-containing catalyst component if other objectives are lowered.

Under these circumstances the endeavor is generally to find embodiments with which not only the particular objectives are achieved but other desired objectives need be lowered as little as possible.

The present invention also conforms to this latter pattern. Its object is to provide a novel type of titanium-containing catalyst component with which, given similar objectives, better results can be achieved than with conventional titanium-containing catalyst components, in particular in respect of the above categories (b) and (d).

We have found that this object is achieved with a titanium-containing catalyst component which is obtained by a special two-stage further treatment of the milled product (IV) obtained from the process defined at the outset.

Accordingly, the present invention relates to a process for the preparation of homopolymers and copolymers of $C_2$–$C_6$-α-monoolefins by polymerizing the monomer or monomers at from 30° to 200° C. under a pressure of from 0.1 to 200 bar, by means of a Ziegler catalyst system comprising (1) a titanium-containing catalyst component and
(2) an aluminum compound of the formula $$AlA_{3-n}X_n$$

where

A is a $C_1-C_{18}$-hydrocarbon radical, preferably a $C_1-C_{12}$-alkyl radical or $C_3-C_{12}$-alkenyl radical, and especially a $C_2-C_8$-alkyl radical, X is chlorine, bromine or hydrogen, preferably chlorine or hydrogen and n is from 0 to 2, preferably from 0 to 1, and especially 0, with the provisos that the atomic ratio of titanium from catalyst component (1) to aluminum from catalyst component (2) is from 1:0.1 to 1:500, preferably from 1:0.2 to 1:200, and that (1.1) to prepare the catalyst component (1)

(1.1.1) a titanium compound (I) of the formula $$TiCl_3 \cdot z(AlCl_3) \text{ or } Cl_m Ti(OB)_{4-m}$$

where z is from 0 to 0.5, especially from 0.31 to 0.35, m is from 0 to 3, especially from 0 to 2, and B is $C_1-C_{18}$-alkyl, especially $C_2-C_8$-alkyl, and (1.1.2) a magnesium alcoholate (II) of the formula $$Mg(OD)_2$$

where D is a monovalent $C_1-C_{18}$ saturated-aliphatic and/or aromatic hydrocarbon radical, preferably a monovalent $C_1-C_{10}$ saturated-aliphatic hydrocarbon radical or phenyl and especially $C_1-C_4$-alkyl, (1.1.3) with or without, but advantageously with, a metal chloride (III) of the formula $AlCl_3$, $ZnCl_2$ or $MnCl_2$, preferably $AlCl_3$, in the weight ratio of titanium compound (I) to magnesium alcoholate (II) of from 1:200 to 1:0.2, preferably from 1:1 to 1:100, and in the weight ratio of titanium compound (I) to metal chloride (III) of from 1:0 to 1:20, preferably from 1:0 to 1:5, are milled, preferably dry, with one another for from 1 to 200, preferably from 5 to 100, hours, under a milling acceleration of from 30 to 70 m/s², to form a milled product ((IV), in which process, when preparing the catalyst component (1), (1.2) in an additional stage (1.2.1) the milled product (IV) obtained according to (1.1), (1.2.2) a $C_1-C_{12}$-alkanol (V), preferably a $C_1-C_8$-alkanol (V) and (1.2.3) a $C_5-C_{12}$-alkane (VI), preferably a $C_6-C_8$-alkane (VI) are brought together in the weight ratios of milled product (IV):alkanol (V) = from 1:0.01 to 1:1, preferably from 1:0.03 to 1:0.75, and milled product (IV):alkane (VI) = from 1:1 to 1:1,000, preferably from 1:1 to 1:100, to form a suspension (VII), and the batch is kept, with continuous mixing, at from 0° to 195° C., preferably from 10° to 100° C., for a period of from 0.5 to 60, preferably from 1 to 30, especially from 1 to 10, minutes, after which (1.3) in a further additional stage (1.3.1) there is added, to the suspension (VII) obtained according to (1.2), (1.3.2) a metal compound (VIII) of the general formula $$Mt\ G_{s-t}\ E_t$$

where

Mt is aluminum, silicon or titanium, preferably aluminum,

G is a $C_1-C_{12}$-hydrocarbon radical, preferably $C_1-C_{12}$-alkyl and especially $C_2-C_8$-alkyl, E is chlorine, bromine, hydrogen or —OR, preferably chlorine or hydrogen, R is a $C_1-C_{12}$-hydrocarbon radical, preferably $C_1-C_{12}$-alkyl, and especially $C_2-C_8$-alkyl, s is the maximum valency of the metal Mt and t is (a) from 0 to s-1, preferably from 1 to 2, if Mt is aluminum, (b) from 0 to 4, preferably from 1 to 4, if Mt is silicon, and (c) 4 if Mt is titanium, whilst maintaining a suspension state, addition being continued until the atomic ratio of magnesium from the solid contained in suspension (VII) to metal from the metal compound (VIII) is from 1:0.1 to 1:20, preferably from 1:1 to 1:10, the product (IX), which results from stage (1.3) and is present as a solid phase in the suspension, constituting the titanium-containing catalyst component (1).

The following details may be noted in respect of the process according to the invention:

The polymerization process as such can, taking into account the characterizing features, be carried out in virtually all relevant conventional technological embodiments, ie. as a batchwise, cyclic or continuous process, which may be, for example, a suspension polymerization, solution polymerization or dry phase polymerization process. The technological embodiments mentioned, ie. the technological embodiments of a Ziegler olefin polymerization, are well known from the literature and industrial practice and further details need not be given here. It may, however, be noted that the novel titanium-containing catalyst component (1) can, like corresponding prior art catalyst components, be brought together with catalyst component (2) outside or inside the polymerization vessel, in the last-mentioned case by, for example, spatially separate introduction of the components; component (1) may be handled in the form of a suspension and component (2) in the form of a solution.

Concerning the novel titanium-containing catalyst component (1), the following may be noted:

It is prepared in three stages referred to in the preceding and following text as (1.1), (1.2) and (1.3).

In stage (1.1), a titanium compound (I) of the type defined above and a magnesium alcoholate (II) of the type defined above, with or without, but advantageously with, a certain metal chloride are milled together, preferably dry, to form a milled product (IV). In stage (1.2), the latter is brought together with a certain alkanol (V) and a certain alkane (VI) and the mixture is treated to form a suspension (VII). In stage (1.3), a metal compound (VIII) of the type defined above is added to the last-mentioned suspension, so as to maintain a suspension state. The solid-phase product (IX) resulting from stage 1.3 and present in the suspension is the novel titanium-containing catalyst component (1).

As regards individual stages, the following may be noted: Stage (1.1)

The milling carried out in this stage exhibits no special features and can be carried out without problems by a skilled worker, without additional guidance. However, it may be mentioned that ball mills, in particular vibratory ball mills, are particularly suitable for the milling process. Stage (1.2)

Preparation of the suspension in this stage also entails no difficulties and is readily achieved by a skilled worker. However, it has proved advantageous first to suspend the milled product (IV) in the alkane (VI), by conventional methods, for example in a stirred vessel, and then to add the alcohol (V) to the resulting suspension at a rate such that local heat build-up is avoided. Stage (1.3)

This stage also presents no problems. It is merely necessary to bear in mind that the reaction taking place is exothermic and hence, again to avoid substantial local heat build-up, the metal compound (VIII) should not be introduced abruptly into the suspension (VII).

The novel titanium-containing catalyst component (1) which results from stage (1.3) in the form of a solid-phase product (IX) in suspension, can be used, as the titanium-containing catalyst component, directly in the form of the suspension obtained, with or without a prior wash by digestion with an alkane. In general, however, it is advantageous first to isolate the solid-phase product and then to employ it as the catalyst component (1). Isolation may be effected, for example, by separating the solid-phase product from the liquid phase by filtration, washing it with a pure alkane (for example of the type used as the suspending medium) and then drying, for example under reduced pressure.

The novel titanium-containing catalyst components (1), ie. the solid-phase products (IX), can be employed, in the initially defined polymerization process, in the same way as the titanium-containing compounds are conventionally employed in a Ziegler olefin polymerization. In this respect, the process according to the invention shows no special features, and reference may be made to the procedures which are well known from the literature and in industrial practice. It should merely be mentioned that the process is particularly suitable for the preparation of ethylene homopolymers and that where copolymers of ethylene with higher α-monoolefins, or homopolymers of higher α-monoolefins, are to be prepared, particularly suitable α-monoolefins are propene, but-1-ene, 4-methylpent-1-ene and hex-1-ene. The molecular weights of the polymers can be regulated in the relevant conventional manner, especially using hydrogen as the regulator.

As regards the materials concerned in the novel titanium-containing catalyst component (1), the following details may be noted:

The titanium compounds (I) to be employed in stage (1.1) can be the relevant conventional compounds conforming to the definition given, for example a titanium trichloride obtained by reducing titanium tetrachloride with hydrogen or with an aluminum trialkyl, a titanium trichloride/aluminum trichloride co-crystalline product of the formula $TiCl_3 \cdot \frac{1}{3}AlCl_3$, as obtained by reducing titanium tetrachloride with metallic aluminum, a tetra-alkyl titanate or a reaction product of one of the above esters with not more than 3 moles, in particular not more than 1 mole, of titanium tetrachloride. The titanium compounds (I) may be employed in the form of individual compounds or of mixtures of two or more compounds.

The magnesium alcoholates (II) also to be employed in stage (1.1) may be derived, for example, from ethanol, n-propanol, i-propanol, n-butanol, sec.-butanol or tert.-butanol, or from phenol. Again, the alcoholates (II) may be employed in the form of individual compounds or of mixtures of two or more compounds.

The metal chlorides (III) which may or may not be employed additionally in stage (1.1) should be in a non-hydrated form.

$C_1$–$C_{12}$-Alkanols (V) are employed in stage (1.2). Specific examples are methanol, ethanol, the propanols, the butanols, n-hexanol, 2-ethylhexanol, n-octanol, n-decanol and 2,7-diethyloctanol. Examples of alcohols which have proved particularly suitable are methanol, ethanol, isopropanol and n-butanol. The alkanols (V) may be employed as individual compounds or as mixtures of two or more compounds.

$C_5$–$C_{12}$-alkanes (VI), eg. cyclopentane, cyclohexane, n-hexane, n-heptane, 2-ethylhexane, n-octane, n-decane or n-dodecane, are also employed in stage (1.2). Preferred alkanes are the hexanes, heptanes and octanes, as individual isomers or mixtures of isomers. n-Heptane is particularly suitable. Again, the alkanes (VI) may be employed as individual compounds or as mixtures of two or more compounds. The metal compounds (VIII) to be employed in stage (1.3) always contain the metal (Mt) in its highest valency, ie. trivalent aluminum, tetravalent silicon or tetravalent titanium. A suitable metal compound (VIII) is advantageously chosen from the following three categories of compounds:

Aluminum compounds represented by the formulae $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ and $Al(C_2H_5)_{1.5}(OC_2H_5)_{1.5}$, amongst which $Al(C_2H_5)_2Cl$, $Al(C_2H_5)_{1.5}Cl_{1.5}$, $Al(C_2H_5)Cl_2$ and $Al(C_2H_5)_2H$ are particularly suitable.

Silicon compounds, as represented by the formulae $SiCl_4$, $SiBr_4$, $Si(CH_3)_2Cl_2$, $Si(CH_3)_3Cl$, $Si(C_2H_5)_3Cl$, $SiHCl_3$, $Si(C_2H_5)_3H$, $Si(OC_2H_5)_4$ and $Si(OC_6H_5)_4$, amongst which $SiCl_4$, $Si(CH_3)_3Cl$, $Si(C_2H_5)_3Cl$ and $Si(C_2H_5)_3H$ are particularly suitable.

Titanium tetrachloride.

The metal compounds (VIII) may be employed in the form of individual compounds or of suitable mixtures of two or more compounds.

The relevant conventional compounds may be used as catalyst component (2); specific examples are $Al(C_2H_5)_3$, $Al(i\text{-}C_4H_9)_3$, $Al(n\text{-}C_4H_9)_3$, $Al(C_8H_{17})_3$ and isoprenylaluminum.

In conclusion, it is to be noted that the novel titanium-containing catalyst components (1) are sensitive to hydrolysis and to oxidation. Accordingly, when handling these substances, the conventional precautionary measures relevant to Ziegler catalysts (for example exclusion of moisture and use of an inert gas atmosphere) should be taken.

EXAMPLE 1

(a) Preparation of the Titanium-Containing Catalyst Component

First Stage

A titanium compound (I) of the formula $TiCl_3 \cdot 0.33 AlCl_3$ and magnesium phenolate (II) are milled dry with one another, in the weight ratio of 1:8, in a conventional ball mill, for 20 hours, under a milling acceleration of 50 m/s$^2$, to give a milled product (IV).

Second Stage 1 part by weight of the milled product (IV) obtained from the first stage, 0.28 part by weight of ethanol (V) and 5 parts by weight of n-heptane (VI) are brought together by first suspending the milled product in the n-heptane and then adding the ethanol to the suspension in the course of 6 minutes. The batch (=suspension VII) is then kept at 50° C. for 20 minutes, with vigorous stirring.

Third Stage

Silicon tetrachloride is added slowly (over 15 minutes) to the suspension (VII) obtained from the second stage, at 25° C., whilst maintaining the suspension state, the addition being continued until the atomic ratio of magnesium from the solid contained in suspension (VII) to silicon is 1:1.

The solid-phase product which results from the third stage and is in suspension, ie. the desired titanium-containing catalyst component, is isolated by filtering off, washing with n-heptane and drying at 25° C. under reduced pressure; the titanium content is 2.88% by weight and the chlorine content 44.9% by weight.

(b) Polymerization By Means of the Titanium-Containing Catalyst Component 4,500 parts by weight of isobutane are introduced into a stirred autoclave which is half-filled; 0.1 part by weight of the novel catalyst component (in the form of a suspension in n-heptane, containing 15% by weight of solids) and 2.5 parts of weight of triethyl-aluminum are then added. Polymerization is then carried out for 2 hours whilst stirring and keeping the following parameters constant by a suitable regulating system: ethylene pressure = 20 bar, hydrogen pressure (for regulating the molecular weight) = 5 bar, temperature = 100° C. The polymerization is then stopped by letting down the autoclave.

Details of the polymer obtained are to be found in the Table given later.

EXAMPLE 2

(a) Preparation of the Titanium-Containing Catalyst Component

First Stage

A titanium compound (I) of the formula $TiCl_3$, magnesium ethylate (II) and aluminum chloride (III), in the weight ratio of titanium compound (I): magnesium compound (II) = 1:3, and titanium compound (I):metal chloride (III) = 1:1, are milled dry with one another, in a conventional ball mill, for 40 hours, under a milling acceleration of 50 m/s$^2$, to give a milled product (IV).

Second Stage 1 part by weight of the milled product (IV) obtained from the first stage, 0.4 part by weight of n-butanol (V) and 2.7 parts by weight of cyclohexane (VI) are brought together by first suspending the milled product in the cyclohexane and then adding the n-butanol to the suspension in the course of 30 minutes. The batch (= suspension VII) is then kept at 50° C. for 15 minutes, with vigorous stirring.

Third Stage

Titanium tetrachloride is added slowly (over 10 minutes) to the suspension (VII) obtained from the second stage, at 25° C., whilst maintaining the suspension state, the addition being continued until the atomic ratio of magnesium from the solid contained in suspension (VII) to titanium is 1:1. Thereafter, the batch is stirred for a further 4 hours at 25° C.

The solid-phase product which results from the third state and is in suspension, ie. the desired titanium-containing catalyst component, is isolated by filtering off, washing with n-heptane and drying at 25° C. under reduced pressure; the titanium content is 8.41% by weight and the chlorine content 49.97% by weight.

(b) Polymerization By Means of the Titanium-Containing Catalyst Component

This is carried out under identical conditions to those described in Example 1, but using the catalyst component described above.

Details of the polymer obtained are again to be found in the Table given later.

EXAMPLE 3

(a) Preparation of the titanium-containing catalyst component

First Stage

A titanium compound (I) of the formula $Cl_1Ti(OB)_3$, where B is iso-butyl, magnesium n-butylate (II) and zinc chloride (III), in the weight ratio of titanium compound (I): magnesium compound (II) = 1:2.3 and titanium compound (I): metal chloride (III) = 1:1.4, are milled dry with one another, in a conventional ball mill, for 30 hours, under a milling acceleration of 55 m/s$^2$, to give a milled product (IV).

Second Stage 1 part by weight of the milled product (IV) obtained from the first stage, 0.28 part by weight of ethanol (V) and 2.7 parts by weight of n-heptane (VI) are brought together by first suspending the milled product in the n-heptane and then adding the ethanol to the suspension in the course of 5 minutes. The batch (= suspension VII) is then kept at 45° C. for 15 minutes, with vigorous stirring.

Third Stage

Ethyl-aluminum dichloride is added slowly (over 15 minutes) to the suspension (VII) obtained from the second stage, at 25° C., whilst maintaining the suspension state, the addition being continued until the atomic ratio of magnesium from the solid contained in suspension (VII) to aluminum is 1:1.5.

The solid-phase product which results from the third stage and is in suspension, ie. the desired titanium-containing catalyst component, is isolated by filtering off, washing with n-heptane and drying at 25° C. under reduced pressure; the titanium content is 5.8% by weight and the chlorine content 38.45% by weight.

(b) Polymerization By Means of the Titanium-Containing Catalyst Component

This is carried out under identical conditions to those described in Example 1, but using the catalyst component described above.

Details of the polymer obtained are again to be found in the Table given later.

In the Table the symbols have the following meaning:
PE = Yield of polyethylene in parts by weight
PE/CC = Productivity in parts by weight of polyethylene per part by weight of the novel catalyst component
PE/Ti = Productivity in parts by weight of polyethylene per part by weight of titanium in the novel catalyst component
BW = Bulk density in g/l
MI = Melt index $MI_{2.16}^{190}$ (g/10 mins)
% < 0.1 = Proportion of polyethylene particles, in % by weight, which have a particle diameter of less than 0.1 mm (fines).

TABLE

| Example | PE | PE/CC | PE/Ti | BW | MI | % <0.1 |
|---|---|---|---|---|---|---|
| 1 | 2600 | 26,000 | 903,000 | 425 | 0.4 | 0.5 |
| 2 | 3680 | 36,800 | 437,600 | 440 | 1.3 | 0.7 |
| 3 | 4750 | 47,500 | 819,000 | 430 | 0.94 | 0.35 |

We claim:

1. A process for the preparation of homopolymers and copolymers of $C_2$–$C_6$-α-monoolefins by polymerizing the monomer or monomers at from 30° to 200° C., under a pressure of from 0.1 to 200 bar, by means of a Ziegler catalyst system comprising
(1) a titanium-containing catalyst component and
(2) an aluminum compound of the formula $$AlA_{3-n}X_n$$

where
A is a $C_1$–$C_{18}$-hydrocarbon radical,
X is chlorine, bromine or hydrogen, and
n is from 0 to 2, with the provisos that the atomic ratio of titanium from catalyst component (1) to aluminum from catalyst component (2) is from 1:0.1 to 1:500, and that
(1.1) to prepare the catalyst component (1)
(1.1.1) a titanium compound (I) of the formula $$TiCl_3.z(AlCl_3) \text{ or } Cl_mTi(OB)_{4-m}$$

where z is from 0 to 0.5, m is from 0 to 3, and B is $C_1$–$C_{18}$-alkyl, and
(1.1.2) a magnesium alcoholate (II) of the formula $$Mg(OD)_2$$

where D is a monovalent $C_1$–$C_{18}$ saturated-aliphatic and/or aromatic hydrocarbon radical,
(1.1.3) with or without a metal chloride (III) of the formula $AlCl_3$, $ZnCl_2$ or $MnCl_2$,
in the weight ratio of titanium compound (I) to magnesium alcoholate (II) of from 1:200 to 1:0.2, and in the weight ratio of titanium compound (I) to metal chloride (III) of from 1:0 to 1:20, are milled with one another for from 1 to 200 hours, under a milling acceleration of from 30 to 70 m/s², to form a milled product (IV), in which process, when preparing the catalyst component (1)
(1.2) in an additional stage
(1.2.1) the milled product (IV) obtained according to (1.1),
(1.2.2) a $C_1$–$C_{12}$-alkanol (V), and
(1.2.3) a $C_5$–$C_{12}$-alkane (VI)
are brought together in the weight ratios of milled product (IV):alkanol (V)=from 1:0.01 to 1:1, and milled product (IV):alkane (VI)=from 1:1 to 1:1,000, to form a suspension (VII), and the batch is kept, with continuous mixing, at from 0° to 195° C., for a period of from 0.5 to 60 minutes, after which
(1.3) in a further additional stage
(1.3.1) there is added, to the suspension (VII) obtained according to (1.2),
(1.3.2) a metal compound (VIII) of the general formula $$MtG_{s-t}E_t$$

where
Mt is aluminum, silicon or titanium,
G is a $C_1$–$C_{12}$-hydrocarbon radical,
E is chlorine, bromine, hydrogen or —OR,
R is a $C_1$–$C_{12}$-hydrocarbon radical,
s is the maximum valency of the metal Mt and
t is (a) from 0 to s-1 if Mt is aluminum, (b) from 0 to 4 if Mt is silicon, and (c) 4 if Mt is titanium,
whilst maintaining a suspension state, addition being continued until the atomic ratio of magnesium from the solid contained in suspension (VII) to metal from the metal compound (VIII) is from 1:0.1 to 1:20, the product (IX), which results from stage (1.3) and is present as a solid phase in the suspension, constituting the titanium-containing catalyst component (1).

2. The process of claim 1 wherein A is a $C_{1-12}$ alkyl or a $C_{3-12}$ alkenyl, X is chlorine or hydrogen, n is 0 or 1, the titanium compound (I) is $TiCl_3.Z(AlCl_3)$, D is a monovalent $C_{1-10}$ saturated aliphatic hydrocarbon radical or phenyl and the metal compound (VIII) is selected from the group comprising $Al(C_2H_5)_2Cl$, $Al(C_2H_5)_{1.5}Cl_{1.5}$, $Al(C_2H_5)Cl_2$, $Al(C_2H_5)_2H$, $SiCl_4$, $Si(CH_3)_3Cl$, $Si(C_2H_5)_3Cl$ and $Si(C_2H_5)_3H$.

3. The process of claim 2 wherein A is a $C_{2-8}$ alkyl, D is a $C_{1-4}$ alkyl and the metal compound (VIII) is $Al(C_2H_5)_2Cl$ or $SiCl_4$.

4. The process of claim 3 wherein n is 0.

5. The process of claim 3 or 4 wherein compound (V) is a $C_{1-8}$ alkanol and compound (VI) is a $C_{6-8}$ alkane.

6. The process of claim 5 wherein the alkanol is ethanol and the alkane is n-heptane.

7. The process of claim 5 wherein the atomic ratio of titanium from catalyst component (1) to aluminum from catalyst component (2) is from 1:0.2 to 1:200, Z is from 0.31 to 0.35, no metal chloride (III) is present, the weight ratio of titanium compound (I) to magnesium alcoholate (II) is from 1:1 to 1:100, the weight ratio of milled product (IV) to alkanol (V) is from 1:0.03 to 1:0.75, the weight ratio of milled product (IV) to alkane (VI) is from 1:1 to 1:100, the mixing-in step (1.2.3) is at from 10° to 100° C. for from 1 to 30 minutes and the atomic ratio of magnesium from the solid contained in suspension (VII) to metal compound (VIII) is from 1:1 to 1:10.

8. The process of claim 6 wherein the atomic ratio of titanium from catalyst component (1) to aluminum from catalyst component (2) is from 1:0.2 to 1:200, Z is from 0.31 to 0.35, no metal chloride (III) is present, the weight ratio of titanium compound (I) to magnesium alcoholate (II) is from 1:1 to 1:100, the weight ratio of milled product (IV) to alkanol (V) is from 1:0.03 to 1:0.75, the weight ratio of milled product (IV) to alkane (VI) is from 1:1 to 1:100, the mixing-in step (1.2.3) is at from 10° to 100° C. for from 1 to 30 minutes and the atomic ratio of magnesium from the solid contained in suspension (VII) to metal compound (VIII) is from 1:1 to 1:10.

* * * * *